CONTROL APPARATUS

Filed Dec. 21, 1956

2 Sheets-Sheet 1

INVENTOR.
Eugene J. Polley
BY John J. Pederson
Attorney

Dec. 25, 1962 E. J. POLLEY 3,070,736

CONTROL APPARATUS

Filed Dec. 21, 1956 2 Sheets-Sheet 2

INVENTOR.
Eugene J. Polley
BY John J. Pederson
Attorney

United States Patent Office 3,070,736
Patented Dec. 25, 1962

3,070,736
CONTROL APPARATUS

Eugene J. Polley, Lombard, Ill., assignor to Zenith Radio Corporation, a corporation of Delaware Filed Dec. 21, 1956, Ser. No. 629,976
16 Claims. (Cl. 318—467)

This invention relates generally to control apparatus and more specifically to a new and improved apparatus for positioning a shaft to a preselected one of a plurality of operating positions.

To obtain full enjoyment of reception of present day television receivers, it is necessary for the viewer to be seated at a substantial distance from the receiver. However, in order to tune the receiver to a next selected program upon the termination of the preceding one, the viewer is subjected to the inconvenient task of removing himself from his comfortable vantage point to manually manipulate the station selector knob to tune the receiver to the desired frequency channel. In fact, such manual operation may not be at all possible if the viewer is physically handicapped and thus confined to his chair or bed. It is therefore highly desirable, both from the standpoint of convenience and necessity, to provide a remotely controlled station selector apparatus which will automatically tune such receivers to the desired channel by manipulation of a remotely located transmitter, such a transmitter being capable of operation by an unskilled operator from his present viewing position with a minimum exercise of physical and mental dexterity.

However, various inherent difficulties are encountered in adaptation of remote control apparatus to present day television receivers. One of the major problems encountered is that, whether a conventional "bandswitch," "turret," or "continuous" tuner is utilized by the receiver as the station selector, in each instance the control shaft of the tuner must consistently be precisely positioned with respect to the corresponding frequency channel to tune the receiver to the desired broadcast station. It is also highly desirable that such a remotely controlled tuning apparatus be adaptable to manual operation at the option of the operator, either when desired or in the event of malfunction of any of the component parts of the remote control apparatus. In the design of such apparatus, it has been found desirable from the standpoint of economy without detriment to quality, that the control signal, which is generated by the transmitter to be utilized by the receiving apparatus, be in the form of a short burst of an unmodulated carrier wave of a predetermined frequency and having a total time duration, for example, in the order of 100 milliseconds. Such a signal is either radiated by the transmitter and intercepted by the receiving apparatus via the surrounding air medium or is directly coupled to the receiver via a cable, whichever is desired. The control signal may, for example, be of one particular frequency to effect one direction of rotation of the tuner shaft of the television receiver and be of a different frequency to effect an opposite direction of rotation. Therefore, the tuner shaft positioning apparatus must be capable of instant response to a control signal of extremely short time duration to effect bi-directional tuning of the television receiver to the next desired frequency channel.

It is therefore an important object of the present invention to devise a new and improved apparatus for automatically positioning a rotatable shaft to a preselected one of a plurality of operating positions.

It is another object of the present invention to devise a new and improved Geneva-type drive mechanism which is adaptable to be utilized by a tuner shaft positioning apparatus for a television receiver.

It is still another object of the present invention to devise a new and improved remotely controlled tuner shaft positioning apparatus which incorporates such a Geneva-type drive mechanism in a unique manner so as to achieve all of the aforementioned highly desirable characteristics.

It is still another object of the present invention to devise a new and improved bi-directional automatic tuner shaft positioning apparatus which is frequency responsive to a pulse train of oscillations generated by a remotely located transmitter.

It is another object of the present invention to devise a new and improved television tuner shaft positioning apparatus which is adaptable to either manual or remote control operation.

It is still another object of the present invention to devise such a remote control apparatus in which the rotatable shaft is sequentially positioned according to a presettable pattern of operating positions.

It is a corollary object of the present invention to provide a new and improved remote control apparatus to precisely position a television tuner shaft in a simple, economical, and trouble-free manner and capable of being operated by an unskilled operator.

In accordance with one feature of the present invention, a new and improved drive mechanism comprises a rotatably supported shaft having a disc operatively connected thereto which has a plurality of circumferentially displaced peripheral cam surfaces. A driving element, rotatable about a predetermined axis, is spaced from the central axis of the disc and includes an eccentric drive pin which is adapted for consecutive engagement with the cam surfaces upon successive complete rotations of the driving element, with the instantaneous effective radii of the disc and the driving element, measured from each point of engagement of the cam surfaces with the drive pin, obliquely canted with respect to each other. Finally, means are provided for rotating the driving element to effect step-by-step rotation of the shaft.

In accordance with another feature of the present invention, the aforementioned eccentric drive pin is spaced from the central axis of the disc by a distance greater than the maximum spacing between the cam surfaces and the central axis of the disc when the driving element is in a reference position. Further means are provided for preventing de-energization of the aforementioned rotating means except when the driving element is in the aforementioned reference position to permit manual rotation of the shaft.

In accordance with still another feature of the present invention, apparatus for automatically positioning a rotatable shaft to any of a plurality of operating positions comprises a Geneva mechanism including a disc in operative engagement with the shaft and provided with a corresponding plurality of peripheral teeth respectively corresponding to the operating positions. A rotatable driving element, having a reference position and including an eccentric drive pin adapted to engage the peripheral teeth of the disc, is provided to actuate the shaft from one operating position to the next for each complete rotation of the driving element from the reference position. A motor is operatively connected for rotating the driving element. Means, including a holding device, are provided for maintaining the motor in an energized condition. Means, responsive to departure of the driving element from the reference position, are provided for locking the holding device in an operative position. Finally, means, including an actuating member, are provided for engaging and releasing the locking means to de-energize the motor upon arrival of the shaft at a preselected position.

In accordance with still another feature of the present invention, apparatus for effecting remote channel selection of a television receiver comprises a frequency-selective tuning means for tuning the television receiver to any of a plurality of different frequency channels and actuatable by a rotatably supported shaft having a corresponding plurality of angular operating positions respectively corresponding to the frequency channels. There is also provided a Geneva mechanism which includes a disc in operative engagement with the shaft and provided with a corresponding plurality of peripheral teeth respectively corresponding to the operating positions. The apparatus further comprises a rotatable driving element having a reference position and including an eccentric drive pin adapted to engage the peripheral teeth of the disc to actuate the shaft from one angular operating position to the next in response to each complete rotation of the driving element from the reference position. A motor is included for rotating the driving element. Means, including a remotely located signal generating means, are provided for instantaneously energizing the motor. Further means, including a holding device, are provided for maintaining the motor in an energized condition. Means, responsive to departure of the driving element from the reference position, are provided for locking the holding device in an operative condition. Finally, means, including an actuating member mounted on the disc, are provided for releasing the locking means to de-energize the motor upon arrival of the shaft at one of the angular operating positions corresponding to a preselected frequency channel.

In accordance with still another feature of the present invention, the Geneva mechanism of the aforementioned remote channel selection apparatus comprises a disc operatively connected to the shaft and having a corresponding plurality of circumferentially displaced peripheral cam surfaces respectively corresponding to the frequency channels. A driving element, rotatable about a predetermined axis, is spaced from the central axis of the disc and includes an eccentric drive pin spaced from the central axis by a distance greater than the maximum spacing between the cam surface and the central axis when the driving element is in a reference position. The driving element is adapted for consecutive engagement with the cam surfaces upon successive complete rotations of the driving element from the reference position, with the instantaneous effective radii of the disc and the driving element, measured from each point of engagement of the cam surfaces with the drive pin, obliquely canted with respect to each other. The aforementioned locking means, when in an operative condition, prevents de-energization of the motor except when the driving element is in the reference position to permit manual rotation of the shaft.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
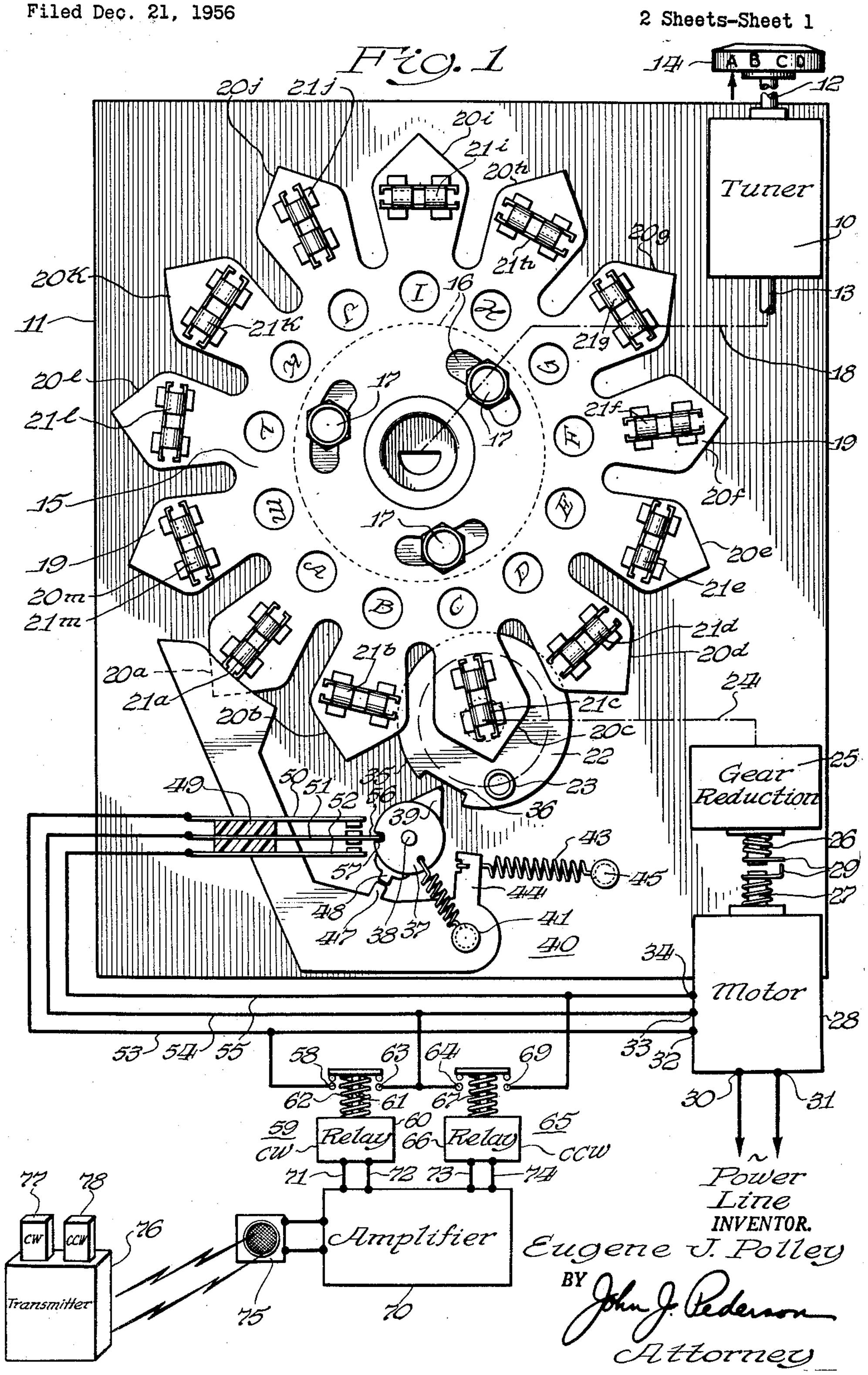
FIGURE 1 is a plan view, partly schematic, of a preferred embodiment of the present invention showing the drive mechanism in a reference position.

With reference to FIGURE 1, there is shown a frequency-selective tuner 10, which may be of the conventional turret or bandswitch variety, suitably adapted for tuning a television receiver, not shown, to any of a plurality of different frequency channels; normally thirteen in number and illustrated in this instance as designations A thru M. Tuner 10 may be directly mounted on the television chassis or on a suitable support such as bracket 11 and is actuatable by a rotatably supported shaft 12 having a rearwardly projecting extension 13. A manually operable control knob 14, having channel designations A thru M, is affixed to one end of shaft 12 to permit manual station selection, all in a well known manner. In accordance with a preferred embodiment of the present invention, a Geneva-type index wheel, shown as disc 15, is adjustably mounted on an adapter 16 by any suitable means such as screws 17 threaded therein. Adapter 16, in turn, is preferably centrally mounted directly on shaft extension 13, but may be rigidly connected thereto by means of a suitable coupling shown diagrammatically as a dotted line 18. Disc 15 is provided with a plurality of circumferentially disposed and equally spaced teeth 19 with individual designations A thru M respectively corresponding to the respective frequency channels of the television receiver. Teeth 19A thru 19M are respectively provided with similar corresponding cam surface undulations 20*a* thru 20*m* which are series connected to form a continuous undulatory cam surface disposed about the periphery of disc 15. Each of the disc teeth is provided with a rotatably adjustable two-position index tab 21 extending upwardly from the plane of the drawing as viewed in FIGURE 1.

A driving cam element 22 is journalled in bracket 11 and is rotatable about an axis substantially parallel to and spaced from the central axis of disc 15; driving cam 22 is preferably centered about an axis intermediate the maximum and minimum distances of cam surfaces 20 from the center of rotation of disc 15, in order to fully utilize the torque exerted by the driving motor in the most efficient manner. A circular drive pin 23 is eccentrically journalled in cam 22 and is spaced from the central axis of disc 15 by a distance greater than the maximum spacing between cam surface 20 and the central axis of disc 15 when cam 22 is in the illustrated reference position to permit manual rotation of disc 15 by control knob 14. Drive pin 23 engages successive cam surfaces 20*a* through 20*m* upon successive complete rotations of driving element 22 from its reference position to effect step-by-step rotation of disc 15, and thus of tuner shaft 12. For reasons to be hereinafter more fully set forth, undulatory cam surfaces 20 are constructed of similar respective contours such that the instantaneous effective radii of disc 15 and driving cam element 22, measured from each and every point of engagement of driving pin 23 with cam surfaces 20, are at all times obliquely canted with respect to each other and in addition, the effective radius of disc 15 is preferably substantially greater than the effective radius of driving element 23. Driving cam 22 is operatively connected to the output shaft, shown diagrammatically as dotted line 24, of a speed reduction gear box 25. Input shaft 26 of gear box 25 is connected to and driven by output shaft 27 of a reversible induction-type electric motor 28 through a wire clutch assembly 29 connected therebetween. Motor 28 is energized by a suitable source of electric power connected to its input terminals 30 and 31 and its rotor is preferably axially offset from its magnetic field and held in this position by means of a biasing spring until the field is energized which then causes the rotor to move axially into the magnetic field and thus engage the clutch 29 and initiate the cycle of the tuning mechanism.

Reduction gear unit 25 is provided with a conventional clutch type brake, not shown, which reduces its driving inertia when motor 28 is de-energized. Motor 28 is provided with a conventional reversing mechanism, not shown, such as an additional stator winding and a capacitor connected to input terminals 32, 33, and 34 in such a manner that when terminals 32 and 33 are connected together, the condenser is switched in series with one of the stator windings to effect rotation of the output shaft of motor 28 in one direction. Alternatively, when terminals 33 and 34 are connected together, the condenser is switched to the other stator winding to cause a phase differential resulting in a change of the direction of rotation of motor output shaft 27. Driving cam 22 is of the "two-step" variety, being provided with a constant radius outer cam surface 35 throughout a major portion of its circumference and a substantially constant radius inner cam surface throughout the remainder of its circumference, shown as slot 36. A pawl 37 is rotatably mounted on a shaft 38 affixed to bracket 11 and has a cam follower extension 39 which is adapted to extend into slot 36 of cam 22 whenever tuner 10 is at rest at any channel position.

A lock link or cam lever 40 is mounted for pivotal movement about a shaft 41 affixed to bracket support member 11 and includes a cam surface 42 adapted for engagement with and to be deflected by pre-settable actuating members such as tabs 21 peripherally mounted on disc 15 at positions corresponding to individual television channels as before described. Tab 21*a*, corresponding to channel A for example, is radially oriented and thus pushes or holds cam lever 40 in the position as shown due to a constant clockwise spring bias applied to lever 40 by a spring 43 connected between a lug projection 44 and a post 45 affixed to bracket support 11. Pawl 37 is spring biased to a null position as shown by a spring 46 connected to the outer periphery thereof and to shaft 41. Cam lever 40 also includes a lug projection 47 adapted to engage a similar lug projection 48 on pawl 37 to lock or release the pawl depending on the angular positions of channel selector index tabs 21, in a manner to be hereinafter more fully described.

A holding device such as single-pole double-throw switch 49 is mounted on bracket support 11, by suitable means not shown, and includes a central flexible contact arm 51 and two outer flexible contact arms 50 and 52, all of which are suitably electrically insulated from each other. Contact arms 50–52 are respectively connected to terminals 32–34 of the reversing apparatus of motor 28 by way of conductors 53–55. Central contact arm 51 is provided with an extension 56 engaging a slot 57 formed in the periphery of pawl 37 for bi-directional actuation as pawl 37 is deflected from its illustrated null position by driving cam 22.

Conductor 53 is connected to one stationary terminal 58 of a solenoid actuated relay 59 having an energizable winding 60 for actuating an axially movable contact carrying plunger member 61 which is biased to a normally open position by a spring 62. The remaining stationary terminal 63 of relay 59 is connected to input terminal 33 of motor 28 and to one stationary contact 64 of a similar solenoid actuated relay 65 having an energizable winding 66 for actuating an axially movable contact carrying plunger member 67 which is also biased to a normally open position by a spring 68. The remaining stationary terminal 69 of relay 65 is electrically connected to input terminal 34 of motor 28. Relay coils 60 and 66 are electrically connected to and selectively energized by an amplifier 70 by way of conductors 71—72 and 73—74 respectively. Amplifier 70, for example, may comprise any number of signal amplifying stages which are selectively responsive to a burst of a predetermined frequency such as 41.25 kc. having a duration of approximately 100 milliseconds as intercepted by a suitable pick-up device connected thereto and shown as 75, to close relay contacts 58 and 63 to effect rotation of tuner shaft 12 in a clockwise direction and selectively responsive to a burst of a different predetermined frequency such as 40.25 kc. of the same duration to close relay contacts 64 and 69 to effect a counterclockwise rotation of tuner shaft 12; a suitable construction is shown and described in Patent 2,817,025, of Robert Adler, for "Control System," issued December 17, 1957, and assigned to the present assignee. A remote-control transmitter 76, such as that shown and described in the aforementioned copending Adler patent, is provided to radiate a short burst of 41.25 kc. signal frequency upon actuation of push-button 77 and to radiate a short burst of 40.25 kc. signal frequency upon actuation of push-button 78.

To facilitate an explanation of the operation of the remote control tuner shaft positioning apparatus of FIGURE 1, it may be assumed that the television receiver is to be operated in a locality serviced by transmitter stations corresponding to frequency channels A, C, F and J. Therefore, corresponding actuating index tabs 21*a*, 21*c*, 21*f* and and 21*j* are preset in an active or radially oriented position, as shown, while the remaining index tabs are preset tangentially with respect to index wheel 15 and are thus in an inactive or passive position. It may also be assumed that the viewer has observed a program being televised over channel A and now desires to tune the television receiver to channel C by remote control.

As channel C can be most directly approached from channel A by clockwise rotation of control knob 14, the viewer actuates clockwise push-button 77 at transmitter 76 to radiate a 100-millisecond duration burst of 41.25 kc. signal; this effects clockwise rotation of tuner shaft 12 to a position corresponding to channel C in the following manner: The 41.25 kc. radiated signal is intercepted by device 75 and is coupled to amplifier 70 wherein the signal is selectively amplified and detected to energize coil 60 of relay 59. When coil 60 is energized, plunger 61 is drawn axially downward for the duration of the control signal to short circuit motor input terminals 32 and 33, thus energizing motor 28 to effect rotation of output shaft 27. As the armature of motor 28 is offset from its magnetic center, upon energization of its stator windings, output shaft 27 moves upwardly as viewed to engage spring clutch 29 and rotate cam 22, through gear reduction 25, in a counterclockwise direction as viewed. Driving pin 23 is thus engaged with cam surface 20*c* to rotate disc 15 one step clockwise upon a complete rotation of cam 22 from its illustrated reference position. When driving cam 22 is moved from its reference position, cam surface 35 is immediately responsive thereto to deflect and hold cam follower 39 in a clockwise direction and deflects switch extension 56 upward closing contacts 50 and 51 to maintain motor 28 energized upon decay of the transmitted signal at which time contacts 58 and 63 of relay 59 open.

Figures 2, 3, 4, 5:
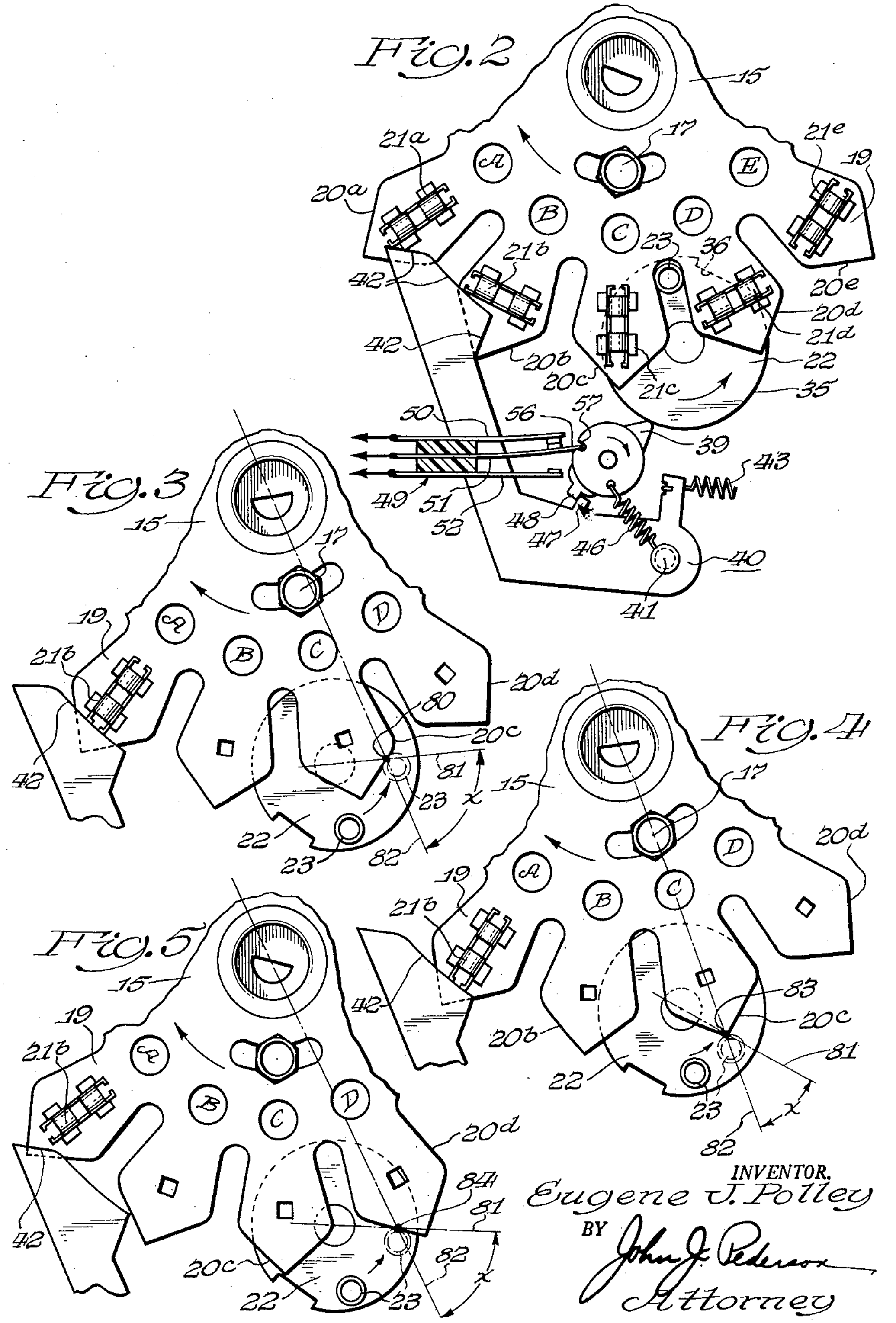
FIGURE 2 is a fragmentary view of the apparatus of FIGURE 1 showing the drive mechanism in an operating position.
FIGURES 3–5 are fragmentary views of the driving mechanism illustrating several possible operating conditions of the apparatus of FIGURE 1.

As index wheel 15 has been rotated one step clockwise, index tab 21*b*, corresponding to channel B, is presented to cam surface 42 of cam lever 40 as shown in FIGURE 2. In this instance, index tab 21*b* has been preset to an inactive position; therefore upon departure of index tab 21*a*, cam lever 40 rotates in a clockwise direction due to the action of spring 43. Lug 47 then engages lug 48 to lock pawl 37 in the position shown in FIGURE 2, maintaining contacts 50 and 51 of switch 49 closed. Therefore, as pawl 37 is locked in its deflected position, motor 28 remains energized even upon presentation of slot 36 to cam follower 39 when driving cam 22 returns to the reference position shown in FIGURE 1. As motor 28 is still energized, driving cam 22 continues to rotate in a counterclockwise direction to engage driving pin 23 with the next cam surface 20*d* and rotate disc 15 another step clockwise. As index tab 21*c*, corresponding to the desired channel C, is positioned in a radial or active position, tab 21*c* engages cam surface 42 in the same manner of engagement of tab 21*a* and surface 42 (FIGURE 1) and deflects cam lever 40 in a counterclockwise direction to disengage lugs 47 and 48, and spring 46 restores pawl 37 to its null position upon the next presentation of slot 36 to cam follower 39. When cam follower 39 falls into slot 36 and pawl 37 is returned to its null position, switch contacts 50 and 51 open to de-energize motor 28. When motor 28 is de-energized, spring clutch 29 is immediately disengaged to eliminate the effect of rotor inertia of motor 28 and the possibility of overtravel, thus insuring positive and precise channel selector indexing.

On the other hand, if the viewer so desires and starting from channel A, counterclockwise push-button 78 of transmitter 76 may be actuated to effect counterclockwise step-by-step rotation of disc 15 until active index tab 21*j*, corresponding to channel J, is presented to cam surface 42 of cam lever 40, at which time tuner shaft 12 is adjusted to receive programs originating on channel J. At this time, the viewer must again actuate push-button 78 to position the tuner shaft to channel F and must actuate push-button 78 for a third time in order to tune the television receiver to the desired frequency channel C.

As driving pin 23 is always returned to its reference position each time the television receiver is tuned to the desired frequency channel as shown in FIGURE 1, and as driving pin 23, when in its reference position, is spaced from the central axis of disc 15 by a distance greater than the maximum radius of disc 15, defined as the maximum distance between cam surfaces 20 and the central axis of disc 15, the viewer has the option of manual tuning of the television receiver to the desired frequency channel by manipulation of station selector knob 14 whenever it is so desired.

In manual operation of the station selector knob, it is possible that tuner shaft 12, and thus disc 15, may inadvertently be left in a position intermediate any two channels. As shown in FIGURE 3, for example, the tuner shaft may be manually set in a stationary position intermediate channels A and M, and it may be desired to effect clockwise rotation of disc 15 by remote control. When clockwise pushbutton 77 of transmitter is actuated to effect counterclockwise rotation of driving cam 22, driving pin 23 is brought into initial engagement with cam surface 20*c* at point 80 as indicated in dotted outline. The contour of cam surface 20*c* is so constructed that a straight line 81 connecting the central axis of cam 22 and point of contact 80 is inclined or obliquely canted with respect to a straight line 82 connecting the central axis of disc 15 and point of contact 80; in other words, the instantaneous effective radii 81 and 82 intersect at an angle X other than 90°. With this construction, a "lock-up" condition of the mechanism is prevented since a resultant force component is always developed in a tangential direction to rotate disc 15.

FIGURE 4 depicts the condition in which disc 15 is stationary at such a position that the initial point of contact 83 of driving pin 23 with cam surface 20*c* occurs at the outermost tip thereof. However, even in this instance, line 81 is obliquely canted with respect to line 82 and thus disc 15 is rotated in the clockwise direction as desired.

FIGURE 5 represents the condition in which disc 15 is stationary at a position such that the initial point of contact 84 of driving pin 23 with the cam surface falls on the adjacent tooth 20*d* of disc 15. In this event, disc 15 is first rotated in a counterclockwise direction for a short distance and then reverses direction of rotation when driving pin 23 engages cam surface 20*c* to rotate step-by-step clockwise as desired. Since each cam surface is symmetrical with respect to its center radius, similar operation is effected upon rotation of driving element 22 in either direction.

Thus the invention provides a new and improved apparatus for automatically positioning a rotatable shaft to any of a plurality of preselected operating positions. The inventive apparatus is particularly useful in providing for remote control of a television receiver to a preselected one of a plurality of frequency channels in a simple yet highly effective manner. The apparatus provides for manual tuning when desired and is readily preset to receive desired channels and reject others simple by appropriate adjustment of convenient index tabs individually corresponding to the frequency channels to which the receiver may be tuned.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In combination: a rotatably supported shaft; a disc operatively connected to said shaft and having a plurality of circumferentially displaced peripheral cam surfaces; a driving element, including a rotatable cam having a peripherally disposed slot, rotatable about a predetermined axis spaced from the central axis of said disc and including an eccentric drive pin spaced from said central axis by a distance greater than the maximum spacing between said cam surfaces and said central axis when said driving element is in a reference position, said pin being adapted for consecutive engagement with said cam surfaces upon successive complete rotations of said driving element, with the instantaneous effective radii of said disc and said driving element, measured from each point of engagement of said cam surfaces with said drive pin, obliquely canted with respect to each other; motor-operated means for effecting successive complete rotations of said driving element to effect rotation of said shaft; and means, including switching means operatively connected to said motor-operated means and a cam follower adapted for engagement with said cam for actuating said switching means to prevent de-energization of said motor-operated means except when said cam is in said reference position with said cam follower in registry with said cam slot, for preventing de-energization of said motor-operated means except wher said driving element is in said reference position to per mit manual rotation of said shaft.

2. The combination, with manually positionable tuning apparatus for receiving broadcasts on a plurality of frequency channels, of automatic tuning means comprising, in combination: means, including power operable apparatus, for positioning said tuning apparatus; means for developing a control signal; means, including an amplifier responsive to said control signal, for enabling said positioning means; means, including apparatus operable in response to operation of said positioning means, for maintaining operation of said positioning means independently of said enabling means; and means, including a corresponding plurality of indexing devices each manually and selectively adjustable between first and second positions and further including apparatus operably interconnectable between said maintaining means and any said indexing device when in said first position but not when in said second position, for disabling said positioning means to stop said tuning apparatus only at preselected channels corresponding to those of said indexing devices adjusted to said first position.

3. The combination, with manually positionable tuning apparatus for receiving broadcasts on a plurality of frequency channels, of automatic tuning means comprising, in combination: means, including power operable apparatus, an indexing gear, and a pin drive for said gear operable by said power apparatus, for positioning said tuning apparatus; and means for developing a control signal means including an amplifier responsive to said control signal, for enabling said positioning means; means, including apparatus operable in response to operation of said positioning means, for maintaining operation of said positioning means independently of said enabling means; and means, including a corresponding plurality of indexing devices mounted upon said indexing gear and each manually and selectively adjustable between first and second positions and further including apparatus operably interconnectable between said maintaining means and any said indexing device when in said first position but not when in said second position, for disabling said positioning means to stop said tuning apparatus only at preselected channels corresponding to those of said indexing devices adjusted to said first position.

4. The combination, with manually positionable tuning apparatus for receiving broadcasts on a plurality of frequency channels, of automatic tuning means comprising, in combination: means, including power operable apparatus, an orbital pin driven by said power operable apparatus, and a gear connected to said tuning apparatus and engageable by said pin in a portion of its orbit, for positioning said tuning apparatus; means for developing a control signal; means responsive to said control signal for enabling said positioning means; means, including apparatus operable in response to operation of said positioning means, for maintaining operation of said positioning means independently of said enabling means; means, including a corresponding plurality of indexing devices each manually and selectively adjustable between first and second positions and further including apparatus operably interconnectable between said maintaining means and any said indexing device when in said first position but not when in said second position, for disabling said positioning means to stop said tuning apparatus only at preselected channels corresponding to those of said indexing devices adjusted to said first position; and means for stopping said orbital pin in a position disengaged from said gear to permit manual adjustment of said tuning apparatus.

5. The combination, with manually positionable tuning apparatus for receiving broadcasts on any of a plurality of frequency channels, automatic tuning means comprising, in combination: means, including power operable apparatus, a drive pin driven by said power operable apparatus, and a gear connected to said tuning apparatus and engageable by said pin, for positioning said tuning apparatus; means for developing a control signal; means responsive to said control signal for enabling said positioning means; means, including apparatus operable in response to operation of said positioning means, for maintaining operation of said positioning means independently of said enabling means; means, including a corresponding plurality of indexing devices mounted upon said gear and each selectively adjustable between pre-fixed first and second positions and further including apparatus operably interconnectable between said maintaining means and any said indexing device when in said first position but not when in said second position, for disabling said positioning means to stop said tuning apparatus only at preselected channels corresponding to those of said indexing devices adjusted to said first position; and means for stopping said pin in a position disengaged from said gear to permit manual adjustment of said tuning apparatus.

6. Indexing apparatus for automatically adjusting the position of a shaft to preselected angularly displaced detented positions, which positions may or may not be uniformly spaced and may be manually selected at the option of the user of the apparatus, comprising in combination: a cam drive mechanism, including a plurally cam surfaced star wheel operatively connected with said shaft and a power driven orbital drive pin obliquely engageable with the cam surfaces of said star wheel for driving same, for selectively positioning said shaft to said preselected positions, said pin having a position in said orbit in which same is incapable of preventing independent movement of said star wheel; a plurality of adjustable indexing devices carried by said star wheel; and means, including control apparatus conjointly responsive to the presence of said drive pin at said position in its orbit and to a predetermined adjustment of any said indexing device, for causing said star wheel to stop only at said preselected positions regardless of the angular displacement between said positions.

7. Remote indexing apparatus for adjusting the position of a shaft to preselected angularly displaced positions, which positions may or may not be uniformly spaced and may be manually selected at the option of the user of the apparatus, comprising in combination: a cam drive mechanism, including a plurally cam surfaced star wheel operatively connected with said shaft and an orbital drive pin cooperable with the cam surfaces of said star wheel, for selectively positioning said shaft to said preselected positions, said pin having a position in said orbit in which same is incapable of preventing independent movement of said star wheel; a plurality of adjustable indexing devices carried by said star wheel; power-operable means for driving said pin in either direction in its orbit at will; and means, including control apparatus conjointly responsive to the presence of said drive pin at said position in its orbit and to a predetermined adjustment of any said indexing device, for causing said star wheel to stop only at said preselected positions regardless of the angular displacement between said positions.

8. Combined manually and mechanically positionable Geneva-type mechanism, comprising in combination: a rotatable shaft; a star wheel operatively connected to said shaft and having surfaces forming a plurality of slots and a plurality of peripheral cam surfaces extending between said slots; a power operated driving element including a reversible motor; an orbital drive pin driven by said motor in two directions and obliquely engageable in a portion of its orbit with said cam surfaces and said slots for rotating said star wheel in either direction; and control means, including apparatus responsive to movement of said pin in said orbit in either direction to a predetermined position of said star wheel, for deenergizing said motor when said drive pin is in a predetermined position in said orbit away from said cam surface and slot contacting portion of said orbit, thereby permitting subsequent manual rotation of said shaft.

9. In combination with a television tuner for automatically tuning to preselected signal channels, comprising: a disc rotatable upon a predetermined axis and operably connected to said tuner; drive means operably connected to said disc for rotating same to effect positioning of said tuner; a plurality of tabs, one for each of said channels, mounted in circumferentially spaced relationship upon a surface of said disc and equidistantly displaced from said predetermined axis at the places of mounting thereof, said tabs being individually adjustable for rotation about individual axes parallel to said predetermined axis to either of two pre-fixed positions to form an adjustable cam of predetermined pattern for preselecting certain of said signal channels; reference position establishing apparatus positioned proximate said surface of said disc for cooperation with said adjustable cam; and means controlling the driving function of said drive means, including holding apparatus operated by conjoint functioning of said reference position establishing apparatus and said cam at channels where said tabs occupy one of said adjusted positions but not where said tabs occupy the other of said positions, for causing said tuner to skip channels preselected by the positioning of said tabs in said one adjusted position.

10. In combination, a rotatably mounted plate having a plurality of rotating stops mounted about the periphery thereof separated by cutouts, a rotatably mounted device for driving said plate having pin means mounted on the surface thereof and extending therefrom arranged to engage said cutouts in said plate, motor means including a rotatable and slidable member adapted to rotate said plate-driving means, a source of energy for said motor means, means connected intermediate said motor means and said energy source for initially energizing said motor means, means for maintaining said motor means energized until said plate rotates a predetermined number of degrees, and rotatably mounted means for actuating said maintaining means under control of said pin means and one of said rotating stops for disabling said maintaining means, whereby said plate is positioned.

11. In combination, a rotatably mounted plate having a plurality of stops mounted about the periphery thereof separated by cutouts, a rotatably mounted device for driving said plate having pin means mounted on the surface thereof and extending therefrom arranged to engage said cutouts in said plate, motor means including a rotatable and slidable member adapted to rotate said plate-driving means, a source of energy for said motor means, means connected intermediate said motor means and said energy source for initially energizing said motor means, means for maintaining said motor means energized until said plate rotates a predetermined number of degrees, and rotatably mounted means for actuating said maintaining means under control of said rotatably mounted device and one of said plurality of stops for disabling said maintaining means, whereby said plate is positioned.

12. In combination: a rotatably mounted plate having a plurality of stops mounted about the periphery thereof and separated by cutouts; a rotatably mounted device, for driving said plate, having eccentric pin means extending therefrom to engage said cutouts in said plate; motor means for rotating said device; a source of energy for said motor means; means connected intermediate said motor means and said energy source for initially energizing said motor means; means for maintaining said motor means energized until said plate rotates a predetermined number of degrees; and means for actuating said maintaining means under control of one of said plurality of stops for disabling said maintaining means, to thereby position said plate.

13. In combination: rotatably mounted tuning apparatus having a plurality of stops mechanically secured thereto and selectively adjustable thereon between effective and ineffective positions; drive means for driving said rotatably mounted apparatus; motor means for operating said drive means; a source of energy for said motor means; means coupled to said motor means and to said energy source for initially energizing said motor means; holding means, including a switch and a switch actuator responsive to the initial energization of said motor means, for completing a holding circuit to maintain said motor means energized until said apparatus rotates a predetermined number of degrees; a sensing device disposed and continuously maintained across the path of travel of said stops to be displaced relative to said path solely in accordance with the sensing of the positions of said stops; and means, including said sensing device, for conditioning said holding circuit to open upon completion of said predetermined number of degrees of rotation when said device senses one of said stops in its ineffective position and for conditioning said holding circuit to continue energization of said motor means for another rotation of said apparatus for said predetermined number of degrees when said device senses one of said stops in its effective position.

14. A remotely controlled mechanism for effecting automatic positioning of a rotatable tuning shaft, comprising: a disc connected to said shaft; a plurality of adjustable stops mechanically and rotatably secured around the periphery of said disc to be rotatably and selectively adjustable between effective and ineffective positions; a motor; drive means driven by said motor for rotating said disc; an energy source for energizing said motor; a receiving system responsive to a control signal from a remote signal source for energizing said motor from said energy source for the duration of said control signal; a switch actuator movable from a stop to a go position in response to initial energization of said motor; a sensing device disposed and continuously maintained across the path of travel of said stops to be displaced relative to said path solely in accordance with the sensing of the positions of said stops; and means for completing a holding circuit for said motor solely in response to movement of said switch actuator to its go position and for thereafter interrupting said holding circuit when said sensing device next senses one of said stops in its ineffective position.

15. A remotely controlled drive mechanism for controlling channel selection of a television receiver, comprising: a tuner to be step-by-step actuated through a sequence of channel positions to selectively tune said teelvision receiver to each one of a plurality of different channels, only certain ones of which are active in a given geographical area; indexing apparatus coupled to, and movable with, said tuner; an indexing disc and a plurality of adjustable indexing elements, each of which is assigned to a respective one of said channels, rotatably mounted on said indexing disc for selective rotatable adjustment thereon between active and inactive positions as determined by the status of the assigned channel; driving means, including an electric motor, for actuating said tuner through its sequence of channel positions; a receiving system responsive to a control signal from a remote source for initially energizing said driving means to actuate said tuner out of its instantaneous channel position; a switch actuator movable from a stop to a go position in response to initial energization of said motor; a sensing device disposed and continuously maintained across the path of travel of said stops to be displaced relative to said path solely in accordance with the sensing of the positions of said stops; and a holding circuit, under the conjoint control of said switch actuator and said sensing device, for maintaining said driving means energized to establish said tuner in the next succeeding active channel position.

16. A remotely controlled drive mechanism for controlling channel selection of a television receiver, comprising: a tuner to be step-by-step rotated through a sequence of channel positions to selectively tune said television receiver to each one of a plurality of different channels, only certain ones of which are active in a given geographical area; indexing apparatus coupled to, and movable with, said tuner and having a plurality of adjustable indexing elements each of which is assigned to a respective one of said channels and each of which has a cam surface which is selectively adjustable to and captivated in active and inactive positions as determined by the status of the assigned channel; driving means, including an electric motor, for rotating said tuner through its sequence of channel positions in either a clockwise or counterclockwise direction; means for initially energizing said driving means to actuate said tuner out of its instantaneous channel position in either the clockwise or counterclockwise direction; sensing means including a cam follower for sequentially sensing the positions of said cam surfaces of said indexing elements; and a holding circuit, at least partially controlled by said sensing means, for maintaining said driving means energized to establish said tuner in the next succeeding active channel position.

References Cited in the file of this patent

UNITED STATES PATENTS

| | | |
|---|---|---|
| 1,930,029 | Alden | Oct. 10, 1933 |
| 2,373,796 | Weidauer et al. | Apr. 17, 1945 |
| 2,512,894 | Gieskieng | June 27, 1950 |
| 2,760,139 | Luebking | Aug. 21, 1956 |
| 2,833,976 | Kennedy et al. | May 6, 1958 |